US007050892B1

(12) United States Patent
Liebl et al.

(10) Patent No.: US 7,050,892 B1
(45) Date of Patent: May 23, 2006

(54) DIAGNOSTIC TOOL SECURITY KEY

(75) Inventors: Troy J. Liebl, Owatonna, MN (US); Kurt R. Raichle, Owatonna, MN (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 09/468,230

(22) Filed: Dec. 21, 1999

(51) Int. Cl.
   *G01M 17/00* (2006.01)
   *G06F 19/00* (2006.01)
   *G06F 7/00* (2006.01)
   *H04L 9/00* (2006.01)
   *H04L 9/32* (2006.01)

(52) U.S. Cl. .................... 701/29; 713/176; 713/187

(58) Field of Classification Search ............ 713/168, 713/176, 188, 200, 201, 202; 701/1, 29, 701/30, 31, 32, 33; 717/171, 172, 173, 176, 717/177, 178; 714/5, 25, 45
See application file for complete search history.

(56) References Cited

U.S. PATENT DOCUMENTS

| | | | |
|---|---|---|---|
| 4,404,639 A | 9/1983 | McGuire et al. | |
| 4,694,408 A | 9/1987 | Zaleski ................ | 364/551 |
| 4,739,323 A | 4/1988 | Miesterfeld et al. | |
| 4,926,331 A | 5/1990 | Windle et al. | |
| 4,962,456 A | 10/1990 | Abe et al. | |
| 4,975,846 A | 12/1990 | Abe et al. | |
| 4,975,847 A * | 12/1990 | Abe et al. ................ | 701/32 |
| 5,003,477 A * | 3/1991 | Abe et al. ................ | 701/33 |
| 5,056,023 A | 10/1991 | Abe | |
| 5,132,905 A | 7/1992 | Takai et al. | |
| 5,150,048 A | 9/1992 | McAuliffe et al. | |
| 5,278,759 A * | 1/1994 | Berra et al. ................ | 701/1 |
| 5,319,962 A | 6/1994 | Kaminski et al. | |
| 5,416,917 A | 5/1995 | Adair et al. | |
| 5,431,049 A | 7/1995 | Kopp ................ | 73/457 |
| 5,442,553 A | 8/1995 | Parrillo ................ | 364/424.04 |
| 5,459,660 A | 10/1995 | Berra | |
| 5,540,099 A | 7/1996 | Harashima ................ | 73/669 |
| 5,541,840 A * | 7/1996 | Gurne et al. ................ | 701/33 |
| 5,555,498 A | 9/1996 | Berra et al. | |
| 5,581,462 A | 12/1996 | Rogers ................ | 364/424.012 |
| 5,596,496 A | 1/1997 | Loeffler ................ | 364/424.034 |
| 5,705,743 A * | 1/1998 | Leonard et al. ................ | 73/116 |

(Continued)

FOREIGN PATENT DOCUMENTS

JP        1210844        8/1989

(Continued)

*Primary Examiner*—Ayaz Sheikh
*Assistant Examiner*—Christian La Forgia
(74) *Attorney, Agent, or Firm*—Baker & Hostetler LLP (57) ABSTRACT

A diagnostic tool includes a security system which prevents the unauthorized downloading of updated software. In one embodiment, a first external storage device includes a first security signature and is electrically coupled to the diagnostic tool. A second external storage device includes software and is also electrically coupled to the diagnostic tool. When a second security signature located within the diagnostic tool is the same as the first security signature included within the first external storage device, the diagnostic tool downloads the software into an internal storage device located within the diagnostic tool. In another embodiment, an external storage device includes software and is electrically coupled to the diagnostic tool. Upon initial use, a first security signature which is the same as a second security signature located within the diagnostic tool is written by the diagnostic tool to the external storage device. Thereafter, if a user attempts to utilize the external storage device with a different diagnostic tool, that diagnostic tool will not run the software located on the external storage device.

29 Claims, 5 Drawing Sheets

U.S. PATENT DOCUMENTS

| | | | |
|---|---|---|---|
| 5,737,711 A | 4/1998 | Abe | |
| 5,815,071 A * | 9/1998 | Doyle | 340/439 |
| 5,848,064 A | 12/1998 | Cowan | 370/338 |
| 5,884,202 A | 3/1999 | Arjomand | 701/29 |
| 5,890,080 A | 3/1999 | Coverdill et al. | |
| 5,893,892 A | 4/1999 | Loeffler | 701/29 |
| 5,916,286 A * | 6/1999 | Seashore et al. | 701/29 |
| 5,922,037 A | 7/1999 | Potts | 701/29 |
| 5,938,716 A * | 8/1999 | Shutty et al. | 701/115 |
| 6,134,488 A * | 10/2000 | Sasaki et al. | 701/31 |
| 6,148,400 A * | 11/2000 | Arnold | 713/168 |
| 6,167,344 A * | 12/2000 | Fackler et al. | 701/115 |
| 6,181,992 B1 * | 1/2001 | Gurne et al. | 701/29 |
| 6,236,917 B1 * | 5/2001 | Liebl et al. | 701/29 |
| 6,252,672 B1 * | 6/2001 | Sugawara et al. | 358/1.15 |
| 6,456,716 B1 * | 9/2002 | Arnold | 380/277 |
| 6,525,672 B1 * | 2/2003 | Chainer et al. | 340/904 |
| 6,526,340 B1 * | 2/2003 | Reul et al. | 701/29 |
| 6,603,394 B1 * | 8/2003 | Raichle et al. | 340/438 |

FOREIGN PATENT DOCUMENTS

| | | |
|---|---|---|
| JP | 3111733 | 5/1991 |
| JP | 8136411 | 5/1996 |

* cited by examiner

DIAGNOSTIC TOOL SECURITY KEY

BACKGROUND OF THE INVENTION

The present invention is directed to a motor vehicle diagnostic tool, and more specifically to a system to prevent unauthorized use of software with a motor vehicle diagnostic tool.

Passwords have been widely utilized to prevent unauthorized access to stand-alone computer systems. Most computer networks utilize passwords to prevent unauthorized access to network resources. Some of these passwords are encrypted to prevent sniffers from determining the passwords when they are transmitted over unsecure transmission paths. In addition, various electronic media have included passwords to prevent illegitimate possessors of the electronic media from utilizing software on the media. While passwords may prevent an illegitimate possessor of the electronic media from utilizing software stored on the media, a password alone will not prevent a legitimate purchaser from utilizing software stored on the media in an unauthorized manner.

Other electronic devices have included the ability to store and secure information and make certain decisions as dictated by a specific application. For example, a smart card is an electronic device (about the size of a credit card) that contains electronic memory and may include a central processing unit (CPU). Smart cards that have not included a CPU have primarily been utilized as information storage cards (e.g., electronic cash), which a user could, for example, spend in a retail transaction. Electronic circuitry in both types of cards has protected the stored information from damage or theft.

Smart cards have also been utilized to ensure secure access to open interactive systems. These cards, among others, have provided encryption key mobility, secure single sign-ons and electronic digital signatures. Smart cards have also been utilized for other purposes, which have included storing an individual's medical records and generating network identifications (IDs). To utilize a smart card, a user inserts the smart card into a smart card reader which allows information stored within the smart card to be read and/or modified.

As is well known to one of ordinary skill in the art, bulletin board systems (BBSs) have been widely utilized to electronically disseminate software. Suppliers of software for diagnostic tools have also utilized BBSs to provide updated software to a customer. On most BBSs of this type, a customer must contact a supplier to receive a certificate number, which has typically been provided at additional cost. The certificate number has been coded so that the BBS can determine which software to electronically provide to the customer. In a typical application, the BBS has canceled or removed the certificate number from its database after supplying the requested software to the customer. Thus, only one copy (or a limited number of copies) of the software are provided to a particular customer. However, providing software to a customer in this manner has not prevented the customer from later making multiple copies of the downloaded software or providing functional copies of the software to others.

In the automotive diagnostic field with the addition of new model vehicles, it is important for the supplier of diagnostic instruments to provide updated software which allows service technicians to utilize an existing diagnostic tool with new vehicle models. The cost of updating the software, however, must be offset by the sales of updated software for use with a particular manufacturer's diagnostic tool. In order to prevent, for example, a large service facility from purchasing a single software update and sharing it amongst multiple service technicians utilizing different diagnostic equipment, it would be desirable to provide a system which prevents unauthorized use of such updated software with multiple diagnostic instruments.

SUMMARY OF THE INVENTION

The present invention is directed to a system for preventing the unauthorized downloading of software into a diagnostic tool. In one embodiment, the system is implemented by electrically coupling a first external storage device to the diagnostic tool. The first external storage device includes a first security signature. A second external storage device which includes software is also electrically coupled to the diagnostic tool. When a second security signature, located within the diagnostic tool, is the same as the first security signature, the diagnostic tool downloads the software into an internal storage device located within the diagnostic tool. In one embodiment, the first external storage device is a smart card that provides the first security signature to the diagnostic tool via a smart card reader. In another embodiment, the second external storage device is electrically coupled to the diagnostic tool through a serial port.

In yet another embodiment, an external storage device is electrically coupled to a diagnostic tool. The external storage device includes software. In an embodiment, the diagnostic tool causes a first security signature to be written to the external storage device. The first security signature is the same as a second security signature that is located within the diagnostic tool. If a user attempts to utilize the software on a different diagnostic tool, that diagnostic tool will not download the software from the external non-volatile storage device. Thus, each diagnostic tool has a unique second security signature and in order for it to download software from the external storage device, the first security signature must be the same as the second security signature. In this manner, the present invention advantageously provides a technique for preventing unauthorized utilization of software with multiple diagnostic tools.

These and other features, advantages and objects of the present invention will be further understood and appreciated by those skilled in the art by reference to the following specification, claims, and appended drawings.

DETAILED DESCRIPTION OF PREFERRED EMBODIMENTS

The present invention is directed to a system for preventing the unauthorized utilization of software by a diagnostic tool. In one embodiment, the system is implemented by electrically coupling a first external storage device (a security key) to the diagnostic tool. The security key includes a first security signature comprising a unique code. A second external storage device which provides software is also electrically coupled to the diagnostic tool. When a second security signature, located within a diagnostic tool, is the same as the first security signature, the diagnostic tool can utilize the software (i.e., download updated software into an internal storage device or a third storage device). In one embodiment, the security key is a smart card that provides the first security signature to the diagnostic tool via a smart card reader. The software can be provided to the diagnostic tool through a serial port (e.g., a USB, an IEEE 1394, an IrDA compatible infrared or a RS232 port), a standard parallel port or through, for example, a Personal Computer Memory Card International Association (PCMCIA) port.

In yet another embodiment, a separate security key is not utilized. In this embodiment, only an external storage device (external plug-in module) is utilized. The external plug-in module, which is electrically coupled to the diagnostic tool, includes software. Before downloading the software into memory, the diagnostic tool compares a first security signature of the external plug-in module with its second security signature. If the external plug-in module does not yet have a first security signature, the diagnostic tool causes its second security signature to be written to the external storage device. Thereafter, if a diagnostic technician (in general, a user) attempts to utilize the software on a different diagnostic tool, that diagnostic tool will not download the software into its memory. In this manner, the present invention advantageously provides a technique for preventing unauthorized utilization of updated software with multiple diagnostic tools.

Figure 1:
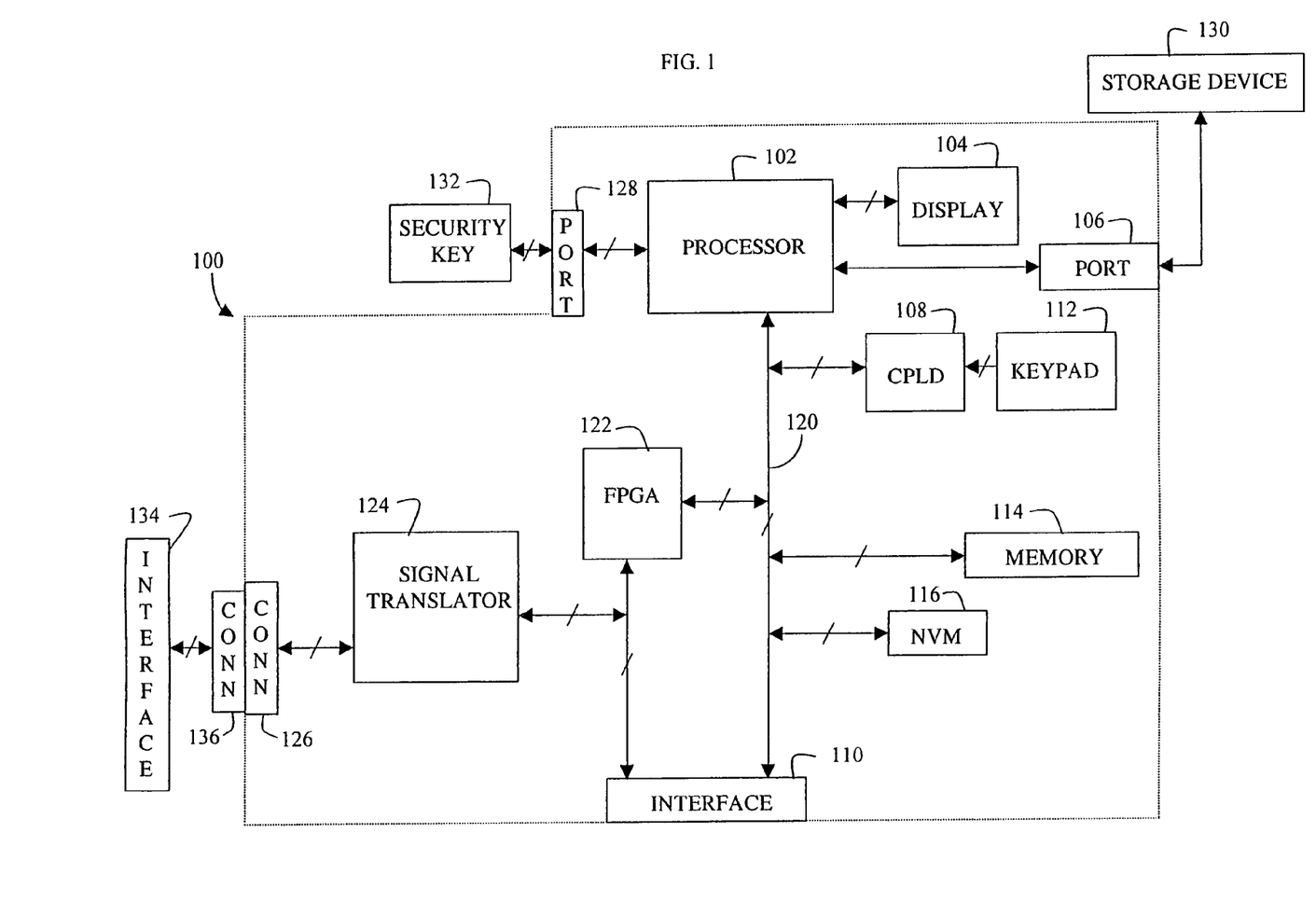
FIG. 1 is an electrical circuit diagram in block form of a diagnostic tool that is coupled to a security key and a storage device, according to an embodiment of the present invention.

FIG. 1 is a block diagram of a diagnostic tool 100 that prevents unauthorized use of software, according to an embodiment of the present invention. Diagnostic tool 100 includes a processor 102 that is coupled to a first storage device (a security key) 132 through a port 128. In a preferred embodiment, processor 102 is an MPC 823 (manufactured by the Motorola Corporation), security key 132 is a smart card and port 128 is a smart card reader. Processor 102 is also coupled to a second storage device 130 through a port 106. Device 130 is utilized to provide updated software to diagnostic tool 100. Processor 102 runs various utilities that allow software on device 130 to be executed from memory subsystem (main memory) 114 or to be stored within an internal non-volatile memory 116 (for later execution from main memory 114). In the embodiment shown in FIG. 1, device 130 can be a Personal Computer Memory Card International Association (PCMCIA) card that plugs into a PCMCIA slot (e.g., port 106). Alternatively, storage device 130 can be a compact flash memory module that plugs into a compatible socket (e.g., port 106).

In the preferred embodiment, diagnostic tool 100 includes a display 104 coupled to processor 102. As depicted in FIG. 1, a keypad 112 is coupled to processor 102 via a complex programmable logic device (CPLD) 108. CPLD 108 is coupled to system bus 120 and decodes input signals from keypad 112 and provides glue logic for various other interfacing tasks. Processor 102 is also coupled, by system bus 120, to a field programmable gate array (FPGA) 122 and interface port 110. Preferably, FPGA 122 is a selectable multiple protocol interface as is disclosed in U.S. Patent Application Ser. No. 09/468,697 entitled "Multi-Vehicle Communication Interface," by David A. Reul et al., filed 12/21/99, assigned to the assignee of the present invention, which is hereby incorporated by reference.

Interface port 110 allows for expansion (e.g., provides a port for connecting, for example, an oscilloscope to the diagnostic tool 100). Memory subsystem 114 and internal non-volatile memory 116 are also coupled to processor 102, via system bus 120. Memory subsystem 114 includes an application dependent amount of dynamic random access memory (DRAM) and read-only memory (ROM). Internal non-volatile memory 116 can be an electrically erasable programmable read-only memory (EEPROM) or flash ROM. Internal non-volatile memory 116 can also provide storage for boot code, self-diagnostics, various drivers and space for FPGA images, if desired.

As shown in FIG. 1, FPGA 122 is coupled to a signal translator 124. Translator 124 is coupled to a motor vehicle communication interface 134 through a connector 126 and an existing vehicle diagnostic connector 136 by an external cable (not shown) that is typically motor vehicle dependent. Translator 124 changes signals received from a control unit to a voltage level compatible with diagnostic tool 100. For example, the J1850 variable pulse width modulation (VPWM) standard requires a high level signal to be between 4.25 and 20 volts and a low level signal to be between ground and 3.5 volts. In a typical 3.3 volt implementation, diagnostic tool 100 would require a high level signal to be between about 2.64 and 3.3 volts and a low level signal to be between ground and about 0.66 volts.

Thus, translator 124 conditions a received signal to a voltage level appropriate for diagnostic tool 100. In a similar manner, translator 124 translates a signal that is being transmitted from diagnostic tool 100 to a control unit, to an appropriate voltage level. In addition to translating J1850 signals, translator 124 can translate signals for ISO 9141, Chrysler collision detection (CCD), data communication links (DCL), serial communication interface (SCI), S/F codes, a solenoid drive, J1708, RS232, controller area network (CAN), a 5 volt I/O, a diagnostic enable and an analog-to-digital (A/D) converter.

Circuitry for translating a signal from one voltage level to another is well known to those of ordinary skill in the art. In the preferred embodiment, translator 124 includes circuitry to translate all signal voltage levels currently implemented within a motor vehicle. As such, the circuitry to translate a particular communication protocol's voltage levels is selected by FPGA 122 (e.g., by tri-stating unused transceivers) or by providing a keying device that plugs into connector 126 that is provided by diagnostic tool 100 to connect diagnostic tool 100 to vehicle communication interface 134.

FPGA 122 transmits to and receives signals (i.e., messages) from a motor vehicle control unit through translator 124. FPGA 122 provides an appropriate signal to signal translator 124 so that a received signal (e.g., data) or a transmitted signal (e.g., a command) is translated, as previously discussed above, according to the communication protocol implemented by the motor vehicle control unit.

As is discussed in the above-referenced U.S. patent application entitled "Multi-Vehicle Communication Interface", FPGA 122 provides a multiple communication protocol interface between processor 102 and a motor vehicle control unit. In the preferred embodiment, FPGA 122 is a 10K50E manufactured by the ALTERA Corporation. The multiple communication protocol interface converts data from a communication protocol implemented by a motor vehicle control unit into a processor readable format. In this manner, processor 102 can read error codes from a control unit and provide test signals to a control unit, such that various actuators and/or sensors within a motor vehicle can be tested.

Figure 2:
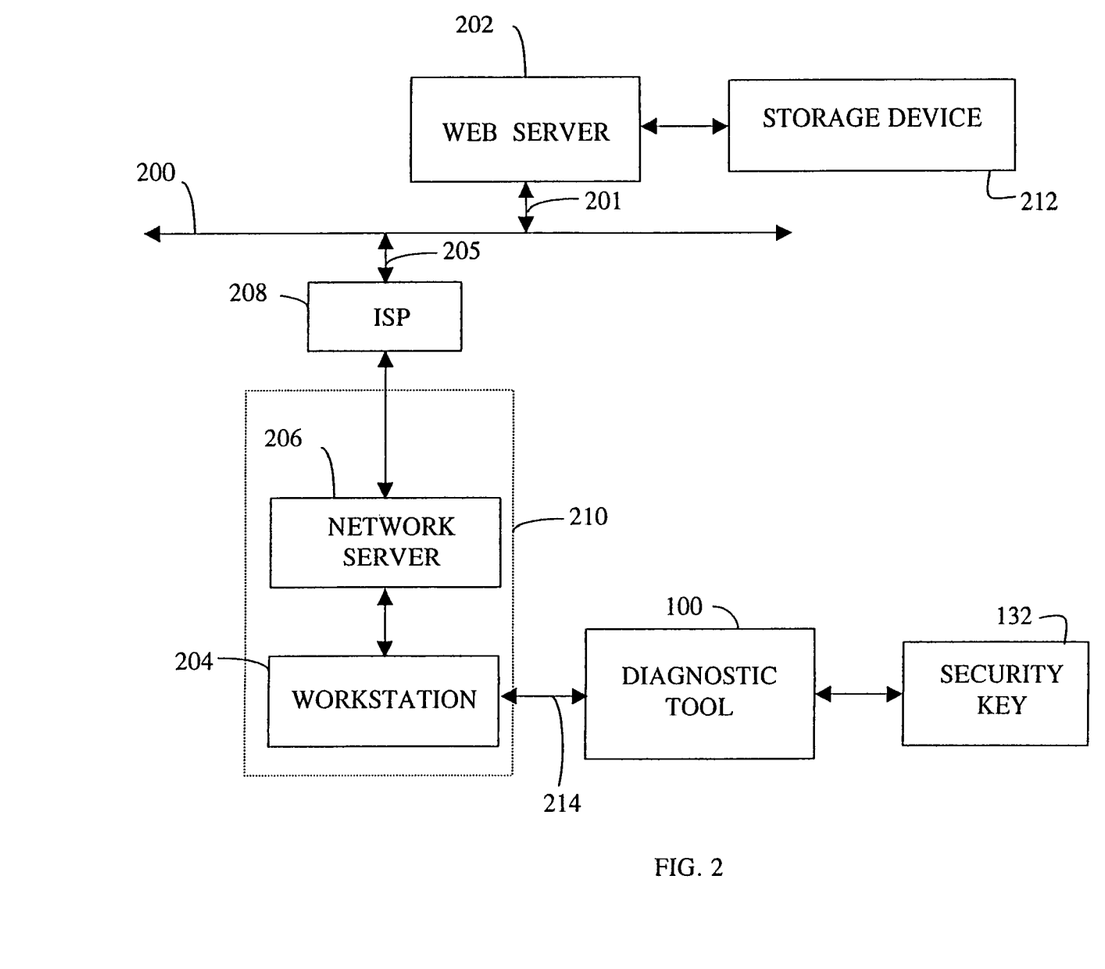
FIG. 2 is an electrical circuit diagram in block form of a diagnostic tool that is coupled to a security key and a workstation, according to an embodiment of the present invention.

FIG. 2 is a block diagram of diagnostic tool 100 receiving software via a workstation 204. As shown in FIG. 2, a security key 132, which is procured from the diagnostic tool manufacturer, is coupled to diagnostic tool 100. As discussed above, in the preferred embodiment, security key 132 is a smart card that is coupled to diagnostic tool 100 via a smart card reader (port 128). In this embodiment, a customer receives updated software through a web server 202. Web server 202 is coupled to a storage device (e.g., a hard disk drive) 212 that stores software. A user operating workstation 204 can initiate transfer of updated software (e.g., diagnostic software) by accessing web server 202. As shown in FIG. 2, web server 202 is coupled to Internet 200 through a communication link 201, such as a T1 line. Access to server 202 is provided through a network server 206, an Internet Service Provider (ISP) 208 and Internet 200. As is well understood by one of ordinary skill in the art, a customer typically accesses web server 202 through a web page and can select various software to be downloaded to workstation 204. In a typical intranet 210, network server 206 is coupled to additional workstations (not shown). In a preferred embodiment, workstation 204 is coupled to diagnostic tool 100 through a serial link 214. Serial link 214 can be an RS232, a universal serial bus (USB), an IrDA compatible infrared or an IEEE 1394 link. Typically, workstation 204 is coupled to network server 206 through a network interface card (NIC) and an Ethernet. The connection 205 between the network server 206 and ISP 208 can, for example, be a T1 line.

When a user of diagnostic tool 100 attempts to download software via workstation 204, diagnostic tool 100 first examines security key 132 to determine if it is present. If key 132 is present, diagnostic tool 100 determines whether a second security signature (stored within diagnostic tool 100) is the same as a first security signature provided in security key 132. If so, diagnostic tool 100 allows software to be downloaded into an internal storage device (e.g., non-volatile memory 116) of diagnostic tool 100. In a preferred embodiment, the internal storage device is a flash ROM. Alternatively, the internal storage device can be an electrically erasable programmable read-only memory (EEPROM) or any other type of non-volatile storage device, as well as, a volatile memory that is continuously powered by a battery.

Thus, when a user of diagnostic tool 100 desires to update software, the user must first procure a security key 132 from the manufacturer. After procuring security key 132 from the manufacturer, a user of diagnostic tool 100 can download the software via Internet 200 (by accessing web server 202). In a preferred embodiment, security key 132 is a use once security key. That is, a security signature of security key 132 is modified after the software is downloaded into an internal memory of diagnostic tool 100. As used herein, the term "software" includes all types of software such as various diagnostic routines (applications), an operating system and utility software.

Figure 3:
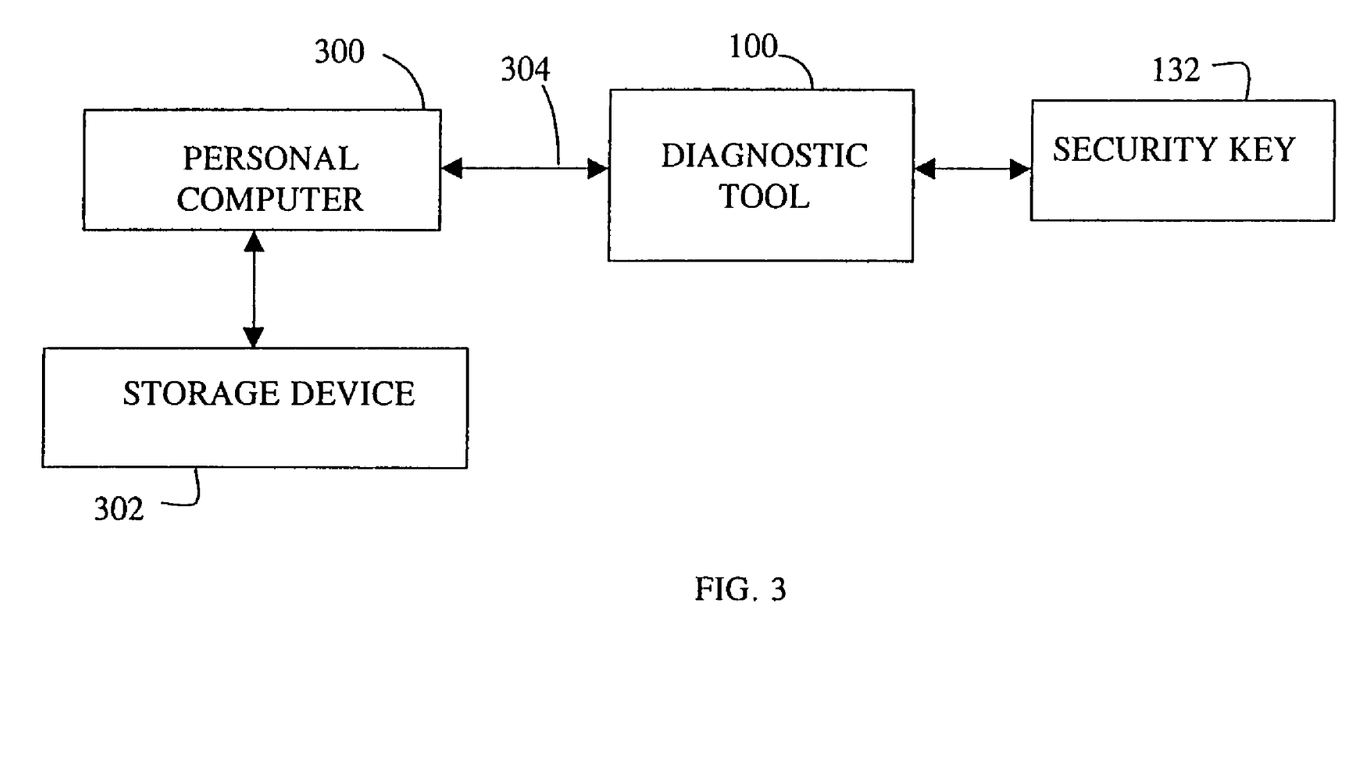
FIG. 3 is an electrical circuit diagram in block form of a diagnostic tool that is coupled to a security key and a personal computer, according to an embodiment of the present invention.

FIG. 3 is a block diagram of a system in which diagnostic tool 100 receives software (e.g., diagnostic software) via a personal computer 300. Again, security key 132 is provided by the manufacturer to the user of diagnostic tool 100. If security key 132 has not been invalidated, as discussed above, security key 132 allows a user of diagnostic tool 100 to download updated software from storage device 302 (such as a compact disk read-only memory (CD ROM) or other disk) via personal computer 300. In this embodiment, personal computer 300 is linked, via serial link 304, to diagnostic tool 100 via port 106 (see FIG. 1). As discussed above, serial link 304 can be an RS232, a USB, an IrDA compatible infrared or an IEEE 1394 link. If desired, link 304 can be a parallel link such as that provided by a centronics interface. In the embodiment of FIG. 3, storage device 302 is preferably a floppy disk. Alternatively, device 302 can be a CD-ROM, a digital versatile disk (DVD), a cassette tape or any other type of removable non-volatile storage device. As should be apparent, floppy disk 302 (supplied by the manufacturer) is inserted into a floppy disk drive (not shown) of personal computer 300.

In general use, a user of a personal computer 300 couples diagnostic tool 100 to personal computer 300 via one of the above mentioned serial/parallel links 304. Personal computer 300 includes appropriate software (depends on the link utilized), which allows personal computer 300 to transfer software from storage device 302 to diagnostic tool 100, via link 304. A utility is initiated in diagnostic tool 100 that allows it to accept software from personal computer 300. As discussed above, with respect to FIG. 2, diagnostic tool 100 verifies that the first security signature on security key 132 is the same as the second security signature located within diagnostic tool 100, before diagnostic tool 100 allows software to be downloaded via personal computer 300.

Figure 4A:
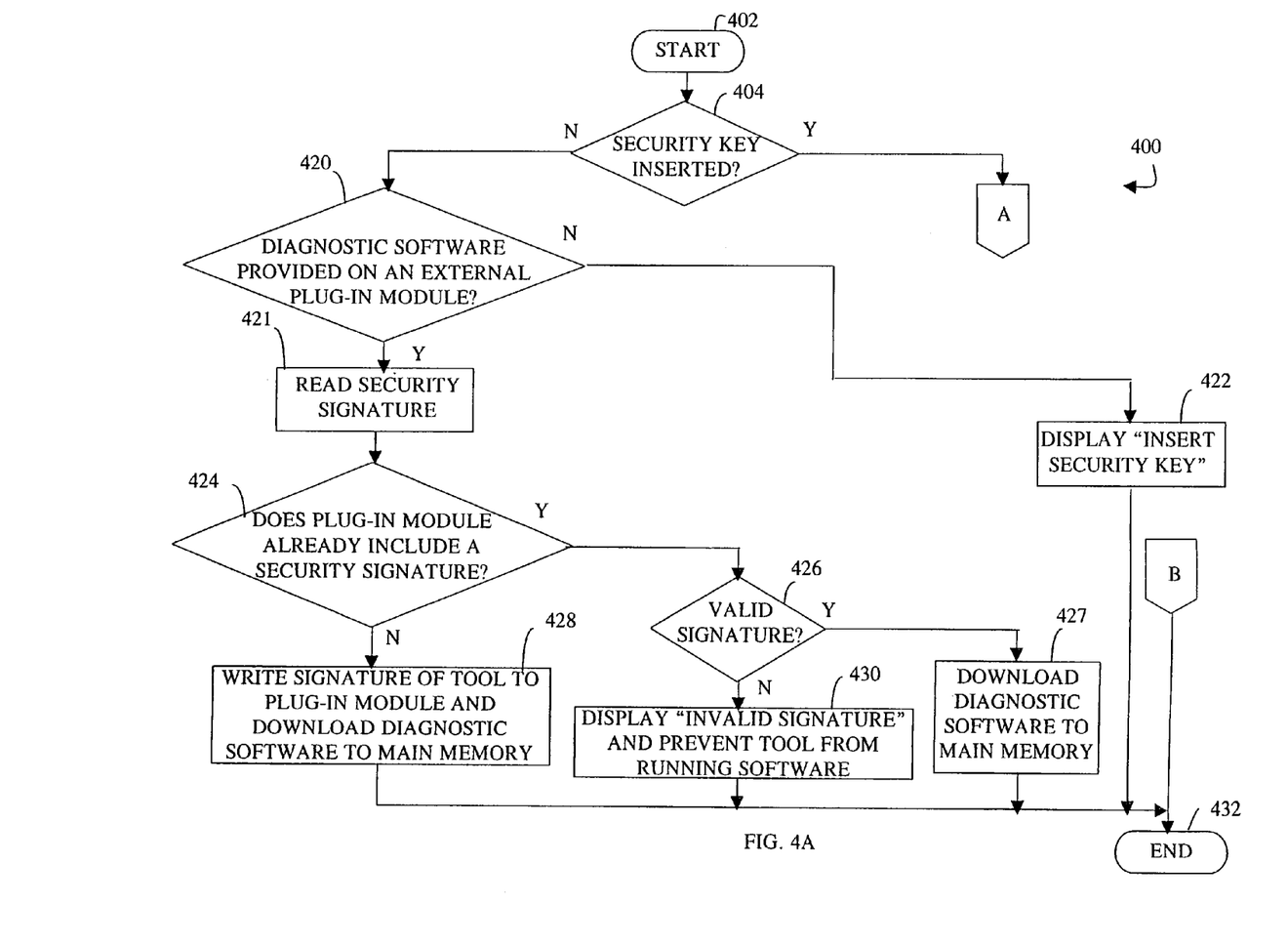
FIGS. 4A–B are a flow diagram of a program for preventing unauthorized use of software by a diagnostic tool, according to an embodiment of the present invention.
Figure 4B:
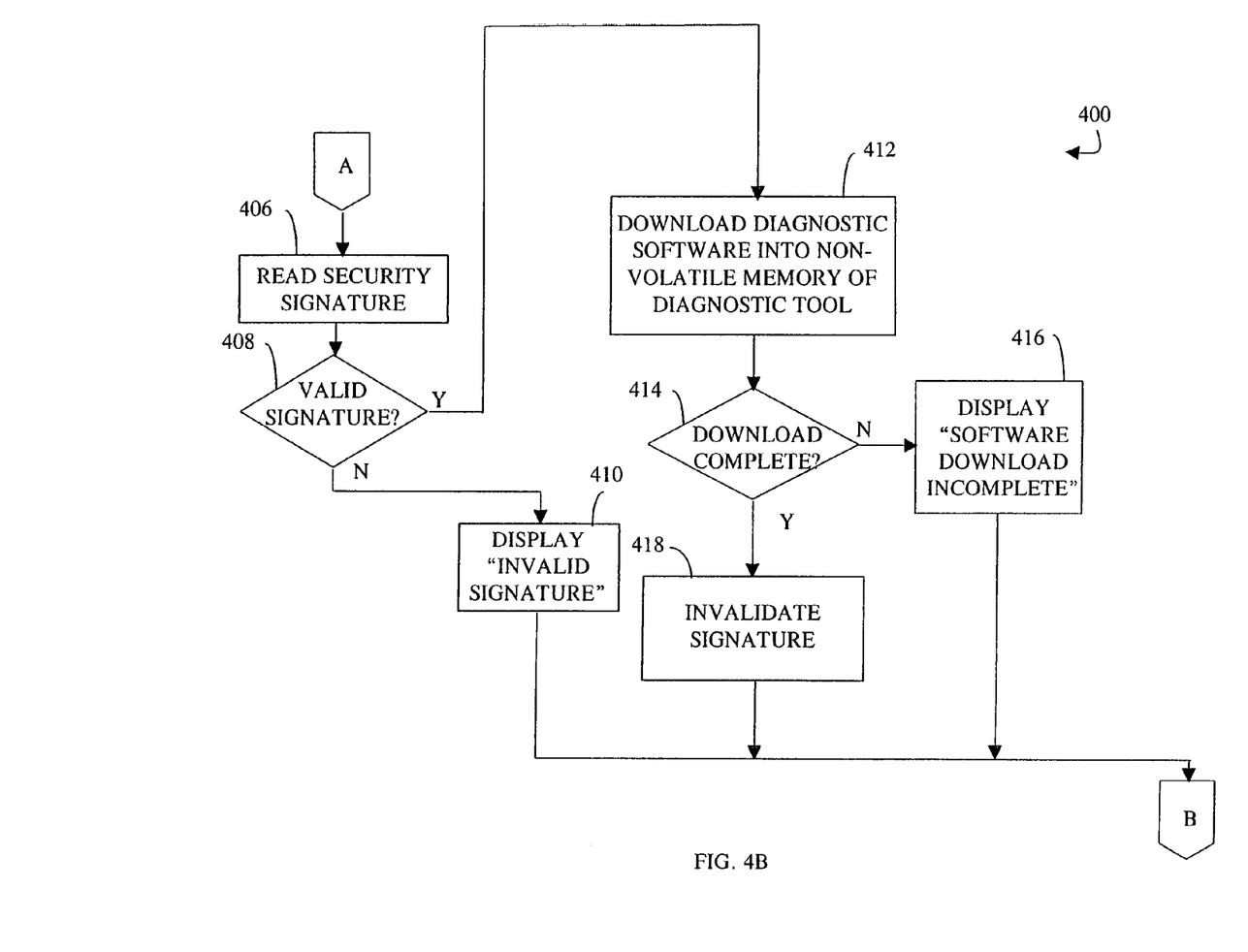

FIGS. 4A–B are a flow diagram of a security program routine 400 contained in non-volatile memory of diagnostic tool 100 as shown in FIGS. 1–3. In step 402, routine 400 is initiated. In step 404, routine 400 determines whether a security key is inserted into diagnostic tool 100. As previously discussed, when software permanently resides on an external plug-in module, a security key is not utilized. As such, in step 404, when a security key is not detected, control transfers to step 420. In step 420, routine 400 determines whether the software is to be permanently provided on an external plug-in module. If so, control transfers to step 421. If not, control transfers to step 422.

In step 422, routine 400 causes the display to prompt the user to insert a security key. From step 422, control transfers to step 432. In step 432, routine 400 terminates. In step 424, routine 400 determines whether the plug-in module includes a first security signature. If so, control transfers to step 426. In step 426, routine 400 determines whether the first security signature is valid. If so, control transfers from step 426 to step 427. In step 427, routine 400 causes the software to be downloaded into the main memory of the diagnostic tool. From step 427, control then transfers to step 432. If the security signature is not valid in step 426, control transfers from step 426 to step 430. In step 430, routine 400 causes the display to provide a message to the user that the first security signature is invalid at which point the diagnostic tool 100 prevents the software from being downloaded into main memory. From step 430, control transfers to step 432.

In step 421, the first security signature is read at which point control transfers to step 424. In step 424, if the external plug-in module does not include a first security signature, control transfers to step 428. In step 428, routine 400 causes the second security signature of the diagnostic tool to be written to the plug-in module (as the first security signature) and the software to be downloaded into main memory. From step 428, control transfers to step 432.

In step 404, if routine 400 detects a security key, control transfers to step 406 (FIG. 4B). In step 406, routine 400 causes the first security signature to be read. From step 406, control transfers to step 408. In step 408, routine 400 determines whether the first security signature is valid (i.e., the same code as the second security signature). If so, control transfers from step 408 to step 412. If not, control transfers from step 408 to step 410. In step 410, routine 400 causes the display to provide an invalid signature message to the user. From step 410, control transfers to step 432. In step 412, routine 400 causes the software to be downloaded into non-volatile memory of the diagnostic tool. From step 412, control transfers to step 414.

In step 414, routine 400 determines whether the download of the software is complete. If the download of the software is complete, control transfer from step 414 to step 418. If not, control transfers from step 414 to step 416. In step 416, routine 400 causes the display to provide a message to the user that the software download is incomplete. From step 416, control transfers to step 432. In step 418, routine 400 causes the first security signature of the security key to be invalidated. From step 418, control transfers to step 432.

Thus, a technique has been described, that determines whether a security key is inserted and based upon the determination, either prompts a user to insert a security key or determines whether a valid first security signature resides on an external plug-in module. In the embodiment that does not utilize a separate security key, the external plug-in module includes software (e.g., diagnostic software) but does not initially contain a first security signature. A diagnostic tool determines whether the first security signature exists and if so whether the signature matches a second security signature located within the diagnostic tool. If the external plug-in module does not already contain a security signature, the diagnostic tool writes its second security signature to the external plug-in module. When the security signature has been written to the external module, the external plug-in module only functions to thereafter provide software when coupled to that particular diagnostic tool.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents

What is claimed is:

1. A method for preventing unauthorized downloading of software into a diagnostic tool, comprising the steps of:
   providing a first external storage device that is electrically coupled to the diagnostic tool, the first external storage device including a first security signature;
   providing a second external storage device that is electrically coupled to the diagnostic tool, the second external storage device including software; and
   downloading the software into an internal storage device of the diagnostic tool when a second security signature included within the diagnostic tool is the same as the first security signature included within the first external storage device.

2. The method of claim 1, wherein the first external storage device is a smart card that provides the first security signature to the diagnostic tool through a smart card reader.

3. The method of claim 1, wherein the second external storage device is electrically coupled to the diagnostic tool through a serial port.

4. The method of claim 3, wherein the serial port is a USB port.

5. The method of claim 3, wherein the serial port is a RS232 port.

6. The method of claim 3, wherein the serial port is an IrDA compatible infrared port.

7. The method of claim 3, wherein the serial port is an IEEE 1394 port.

8. The method of claim 1, further comprising the step of:
   modifying the first security signature upon successful downloading of the software into the internal storage device located within the diagnostic tool.

9. The method of claim 8, wherein the first security signature is modified so that it cannot be further utilized to download the software into any diagnostic tool.

10. The method of claim 9, wherein the first security signature is erased.

11. A diagnostic tool for communicating with a plurality of motor vehicle control units, the diagnostic tool preventing the unauthorized downloading of software into the diagnostic tool, the diagnostic tool comprising:
    a processor for controlling the downloading of software into the diagnostic tool;
    a first port for electrically coupling the processor to a first storage device, the first storage device including a first security signature; and
    a second port for electrically coupling the processor to a second storage device, the second storage device including software, wherein the diagnostic tool downloads the software into a third storage device located within the diagnostic tool when a second security signature stored within the diagnostic tool is the same as the first security signature included within the first storage device.

12. The diagnostic tool of claim 11, wherein the first storage device is a smart card that provides the first security signature to the diagnostic tool through a smart card reader.

13. The diagnostic tool of claim 11, wherein the second storage device is electrically coupled to the diagnostic tool through a serial port.

14. The diagnostic tool of claim 13, wherein the serial port is a USB port.

15. The diagnostic tool of claim 13, wherein the serial port is a RS232 port.

16. The diagnostic tool of claim 13, wherein the serial port is an IRDA compatible infrared port.

17. The diagnostic tool of claim 13, wherein the serial port is an IEEE 1394 port.

18. The diagnostic tool of claim 11, wherein the processor causes the first security signature to be modified upon successful downloading of the software into the third storage device located within the diagnostic tool.

19. The diagnostic tool of claim 18, wherein the first security signature is modified so that it cannot be further utilized to download the software into any diagnostic tool.

20. The diagnostic tool of claim 19, wherein the first security signature is erased.

21. The diagnostic tool of claim 11, wherein the first storage device is a smart card and the second storage device is a flash ROM.

22. The diagnostic tool of claim 11, wherein the first storage device is a smart card and the second storage device is an EEPROM.

23. The diagnostic tool of claim 11, further including:
    a keypad coupled to the processor for receiving input from a user, the user initiating the downloading of the software by selecting a particular menu item from a list of menu items; and a display coupled to the processor for providing the list of menu items to the user of the diagnostic tool.

24. A method for preventing unauthorized downloading of software into a diagnostic tool, comprising the steps of:
providing an external storage device that is electrically coupled to the diagnostic tool, the external storage device including a first security signature and software; and
downloading the software into a memory of the diagnostic tool when a second security signature included within the diagnostic tool is the same as the first security signature included within the external storage device.

25. The method of claim 24, further including the step of:
storing the second security signature of the diagnostic tool as the first security signature on the external storage device when the first security signature is determined to be a default value.

26. The method of claim 24, wherein the external storage device is a flash ROM.

27. A diagnostic tool for communicating with a plurality of motor vehicle control units, the diagnostic tool preventing the unauthorized downloading of software by the diagnostic tool, the diagnostic tool comprising:
a processor for executing the software;
a port for electrically coupling the processor to an external storage device, the external storage device including a first security signature and software, where the diagnostic tool downloads the software into a memory of the diagnostic tool when a second security signature included within the diagnostic tool is the same as the first security signature included within the external storage device.

28. The diagnostic tool of claim 27, wherein the processor causes the second security signature of the diagnostic tool to be stored as the first security signature on the external storage device when the first security signature is determined to be a default value.

29. The diagnostic tool of claim 27, wherein the external storage device is a flash ROM.

\* \* \* \* \*

UNITED STATES PATENT AND TRADEMARK OFFICE
CERTIFICATE OF CORRECTION

| | | |
|---|---|---|
| PATENT NO. | : 7,050,892 B1 | Page 1 of 1 |
| APPLICATION NO. | : 09/468230 | |
| DATED | : May 23, 2006 | |
| INVENTOR(S) | : Troy J. Liebl et al. | |

It is certified that error appears in the above-identified patent and that said Letters Patent is hereby corrected as shown below:

<u>Column 8</u>

Line 44, please replace "IRDA" with --IrDA--.

Signed and Sealed this

Twenty-second Day of August, 2006

JON W. DUDAS
*Director of the United States Patent and Trademark Office*